Sept. 5, 1933.  R. BECK  1,925,515
RECORDING INSTRUMENT
Filed Oct. 20, 1931   3 Sheets-Sheet 1
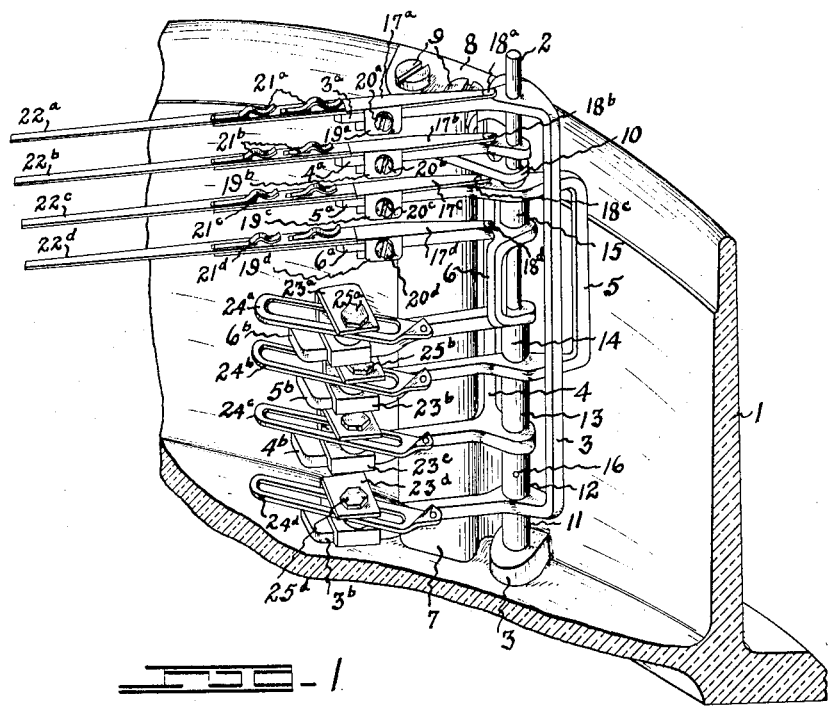
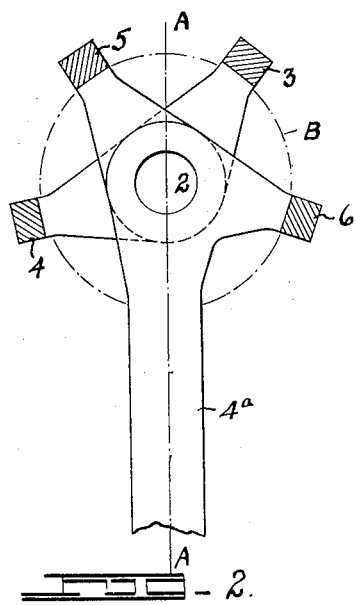
INVENTOR
Rudolf Beck
BY
ATTORNEYS.

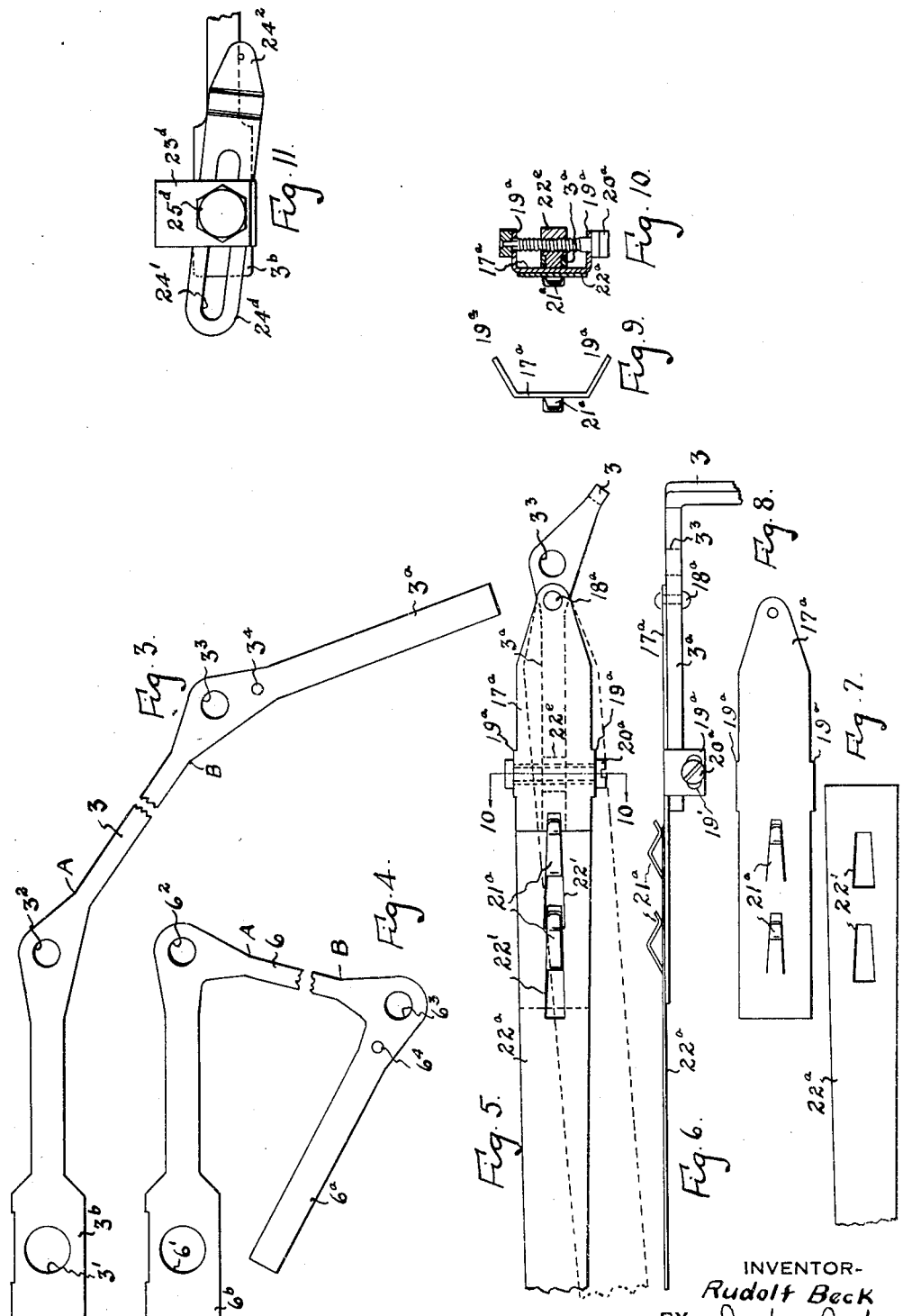

Sept. 5, 1933.　　　　　R. BECK　　　　　1,925,515
RECORDING INSTRUMENT
Filed Oct. 20, 1931　　　3 Sheets-Sheet 3

INVENTOR-
Rudolf Beck
BY Darby & Darby
ATTORNEYS

Patented Sept. 5, 1933

1,925,515

UNITED STATES PATENT OFFICE 1,925,515

RECORDING INSTRUMENT

Rudolf Beck, Bridgeport, Conn., assignor to Consolidated Ashcroft Hancock Company, Inc., Bridgeport, Conn., a corporation of Delaware Application October 20, 1931. Serial No. 569,868

12 Claims. (Cl. 234—1)

This invention relates to improvements in the construction of instruments by means of which indications or permanent continuous records of variable factors, such as temperature, pressure and the like, may be made.

The invention involves more particularly recording instrument constructions employing multiple pen recording arms.

The invention involves simplified structures, for multiple pen arm movements, for such instruments particularly adapted for making a continuous record of the condition to be recorded usually on some form of coordinated paper, such for example as a polar chart.

These and many other objects, which will appear specifically in detail hereinafter, are secured by means of this invention.

This invention resides substantially in the combination, construction, arrangement and relative location of parts, all as will be described in greater detail hereinafter.

Referring to the drawings—

Figure 1 shows in perspective one form of multiple pen arm movement employing this invention;

Fig. 2 is a very diagrammatic top plan view of the relative arrangement of the pen arm shafts;

Figs. 3 and 4 are plan views of the metal blanks from which the pen arm shafts are formed by simple bending operations;

Fig. 5 is an enlarged plan view with a portion broken away of one of the pen arms and its connection with the supporting shaft;

Fig. 6 is a side elevational view of this construction;

Fig. 7 is an enlarged plan view of a portion of the pen arm showing details of construction;

Fig. 8 is a plan view of the arm to which the pen arm is attached, showing details of construction;

Fig. 9 is an end elevational view of Fig. 8;

Fig. 10 is a cross-sectional view taken on the line 10—10 of Fig. 5;

Fig. 11 is an enlarged detail plan view of the mechanism by means of which calibration of the instrument is easily attained;

Figure 12:
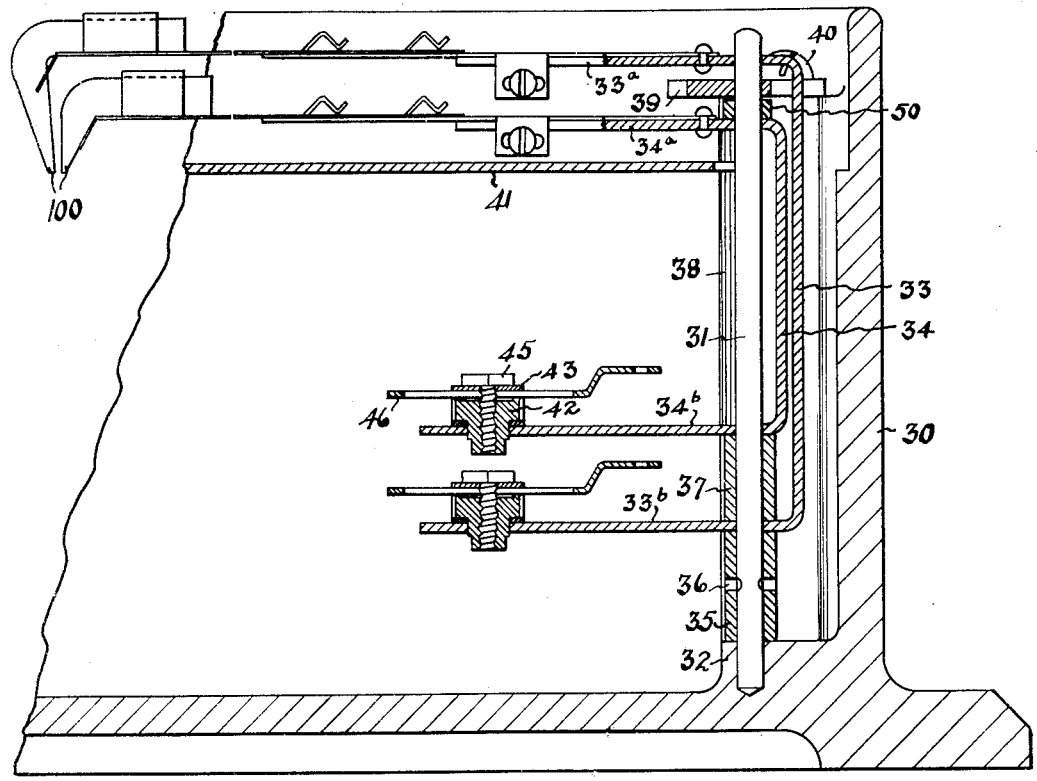
Fig. 12 is a vertical cross-sectional view with some parts broken away of a modified form of the invention.

The invention itself and the scope thereof will be better appreciated by detailed reference to the drawings. In Fig. 1 there is shown a portion of a suitable instrument casing 1 within which is mounted an arbor 2 on which the pen arm mechanism is pivotally mounted. Freely mounted for rotational movement on the arbor 2 are the pen arm supporting members 3, 4, 5 and 6. These members are generally U-shaped in form having, in the position shown in Fig. 1, vertical portions terminating at each end in parallel arms $3^a$, $3^b$; $4^a$, $4^b$; $5^a$, $5^b$; and $6^a$, $6^b$; for the members 3, 4, 5 and 6, respectively.

As illustrated in this disclosure the vertical portions of these members do not lie in the same plane as the parallel arm members, but lie in a plane at an angle with the axes of these members. This offsets the vertical portions of each of the members so that, as indicated in Fig. 2, they all move about the pivoted arbor on the same radius of rotation.

At 7 is a second integral boss formed on the interior of the instrument casing 1 to which is secured a bracket plate 8 by means of screws 9. The arbor 2 passes through the end 10 of this bracket plate 8, as is clear in Fig. 1, and serves both as a brace for the upper end of the arbor and for retaining the U-shaped members on the arbor. At 11, 12, 13, 14 and 15 are spacer members or sleeves assembled on the arbor with respect to the U-shaped members 3, 4, 5 and 6 so as to properly support and space these members from each other. At 16 is a small pin passing entirely through the sleeve 12 and arbor 2 so as to lock, in connection with the bracket 8, all of the spacers and U-shaped members on the arbor. This single pin also acts to restrict arbor 2 to a limited longitudinal movement represented by the play between the parts. Arbor 2 slidably fits within a hole in boss 3' so that it is not restricted against this limited longitudinal movement nor against rotational movement.

Normally such an instrument as disclosed is employed in such a position that the arbor 2 lies in a horizontal plane. Hence, as a result of the construction just described, the U-shaped members 3, 4, 5 and 6 and their attached parts are very securely mounted, resulting in a minimum of rotational friction resistance and end thrust resistance on the spacers or sleeves.

One of the distinguishing features of this construction which has been briefly referred to is indicated in Fig. 2 where all of the vertical portions of the U-shaped members oscillate in a circular path of the same radius. All of the horizontal parallel arms, as indicated by the upper arm $4^a$ in Fig. 2, are assumed in this figure to lie directly one above the other so that only the upper arm appears in the drawing. Thus, with these arms in alignment as indicated in the figure, the vertical portions of the U-shaped members lie at different angular portions with respect to each other. In the normal use of the instrument the arcs of movement of these members are such that they do not in their extreme positions touch each other and hence do not interfere in their movement, one with the other, in actual use. Thus the range of movement of these parts is such that none of the U-shaped members interfere with the movement of the others. If desired stops may be employed on each side of the arms, or the operating mechanism connected thereto, so that in its normal operation of these members they do not interfere with one another.

The disposition of the U-shaped center bars and the U-legs around the central arbors is shown diagrammatically in Fig. 2 in one practical form of a four pen arm movement, such as illustrated in Fig. 1. The angle described by the pen arms $22^a$, $22^b$, $22^c$, and $22^d$, as determined by the chart dimensions and the length of the pen arms, is 42° in, for example, a 10″ recorder. The pen arms are adjustable relative to the U-legs $3^a$, $4^a$, $5^a$, and $6^a$ to which they are attached through an angle of plus or minus 5° from their central position so that the U center bars for the respective arms have each a total possible angular travel of 42° plus 10° or 52°. Measured on the inside edge circle B, Fig. 2 of the U center bars, which is the circle of maximum interference, each center bar swings through an arc of 17°. The U-legs swing through an arc of 30°, which leaves five free angles of 52° 24′ each between the U-legs and the center bars. As the U-legs swing not more than plus or minus 26° from the center line A—A, each U center bar also swings a maximum of plus or minus 26° from its position so that there will be no interference in any of the working positions. As stated above, the maximum swing of the U-arms may be limited by spaced stops or the instruments may be adjusted so that in actual or normal use they do not swing more than plus or minus 26° from the center line A—A. It is to be understood that the above example is given for a multiple pen arm instrument having four pen arms and will vary in an obvious manner, depending upon the number of pen arms used on the instrument.

Referring again to Fig. 1, the upper U-arms $3^a$, $4^a$, $5^a$, and $6^a$ have secured to them by means of pivot pins $18^a$, $18^b$, $18^c$, and $18^d$ the arms $17^a$, $17^b$, $17^c$, and $17^d$. The pivot pins firmly secure the arms to the U-arms while permitting relatively free rotary movement thereof. Each arm $17^a$, $17^b$, $17^c$, and $17^d$ is provided with two integral side tabs or flaps $19^a$, $19^b$, $19^c$, and $19^d$. An adjusting screw $20^a$, $20^b$, $20^c$, and $20^d$ is provided for oscillating the arms in a manner to be described in detail later. Each one of the arms $17^a$, $17^b$, $17^c$, and $17^d$ is provided with several integral struck up spring fingers $21^a$, $21^c$, $21^b$, $21^d$. Detachably secured to this mechanism by means of these spring fingers are the pen arms $22^a$, $22^b$, $22^c$, and $22^d$. These pen arms, insofar as the pen or marking portions thereof, are not described in detail herein since they are known in the art in many forms.

The lower U-arms $6^b$, $5^b$, $4^b$, and $3^b$ are each provided with U-shaped clips $23^a$, $23^b$, $23^c$, and $23^d$ by means of which, together with screws or small bolts $25^a$, $25^b$, $25^c$, and $25^d$, the adjustable arms $24^a$, $24^b$, $24^c$, and $24^d$ are secured to the lower U-arms. These adjusting arms are adjustable both axially and circumferentially about their centers of support to aid in the calibration of the instrument, as will be described in detail later.

The details of construction of the parts shown generally in Fig. 1 will now be explained. By way of example, two forms of the method of making the U members are illustrated in Figs. 3 and 4. Thus the U members 3 and 6 are illustrated in these figures respectively. They are stamped, or otherwise formed from stock, in the shape shown, which shape will vary depending upon the number of pen arms used in the instrument of which they are to be a part. The U member 3 is provided in its U arm $3^d$ with a hole 3′. Holes $3^2$ and $3^3$ are the holes through which the arbor 2 passes. The hole $3^4$ receives the pivot pin $18^a$. In a similar manner the U member 6 is provided with holes 6′, $6^2$, $6^3$, and $6^4$. It will be noted that this stamping is of a different shape so that when it is bent into form the U-arms will lie at the proper angle with respect to the plane of the central portion. These stampings are formed into finished shape by two simple bending operations. In each case the center portion and the upper U-arm ($3^a$ and $6^a$) are bent upwardly at A out of the plane of the paper to a position at right angles to the other U-arms ($3^b$ and $6^b$). The upper U-arm in each case ($3^a$ and $6^a$) is then bent over at right angles to the central portion 3 at the point $b$ so as to lie parallel to the lower U-arms ($3^b$ and $6^b$). Thus by two simple bending operations the stampings are completely formed. When they are all prepared they are assembled on the central arbor in the obvious and exceedingly simple manner and pin 16 is inserted and bracket 18 secured in place to lock all of the members in operative position.

The pen arms, adjusting mechanism, and attachment to the U members are clearly shown in Figs. 5 to 10, inclusive. The mechanism of the upper pen arm will be described in detail, it being remembered that the structure is duplicated for other arms. The arm or lever $17^a$ is shown pivotally attached to the upper U-arm $3^a$ of the U member 3 by means of the pivot pin $18^a$. This lever $17^a$ is provided on each side with a flap or tab $19^a$, each of which is provided with an elongated hole 19′. The normal position of these flaps is that illustrated in Fig. 9 so that they lie at an obtuse angle with the plane of the arm $17^a$. The adjusting screw $20^a$ extends through the elongated holes 19′ in the flaps and threadedly engages with a nut $22^e$ which is secured to the under surface of the upper U-arm $3^a$. When the screw is secured in place with the parts assembled, as shown in Fig. 10, the tabs $19^a$ are forced down into right angle position with lever $17^a$ so as to frictionally resist rotation of the screw $20^a$. As the screw $20^a$ is turned in one direction or the other the lever $17^a$ is oscillated about the pivot pin 18 to the right or left. Since the nut $22^e$ is rigidly secured to the U-arm $3^a$ the elongated holes 19 are provided so that the screw $20^a$ will not bind as the lever $17^a$ approaches the extreme of movement in either direction from its center position. By reason of the frictional resistance offered to the rotation of screw $20^a$ by the compressed flaps $19^a$ the pen arms are insured against getting out of adjustment.

Lever $17^a$, as is shown clearly in Fig. 8, is provided with two integral spring fingers $21^a$ struck out of the body portion. The general outline of these fingers is trapezoidal. The pen arm $22^a$ is provided with complementary openings 22′ which are likewise trapezoidal in shape. The pen arm is secured to the lever 17ª by slipping it over the spring fingers and pulling it longitudinally to the left (Fig. 5) so that the smaller ends of the trapezoidal openings 22' are pulled back against the bases of the spring fingers 22ª thus locking the pen arms against transverse movement with respect to the lever 17ª. In other words, the width of the spring fingers at the base or point of attachment with the lever 17ª is substantially the same as the width of the trapezoidal openings 22' at their small ends.

The construction of the mechanism by means of which the operating device is attached to the apparatus of this invention is illustrated in plan view in Fig. 11, which will be readily understood in connection with Fig. 1 and the cross-sectional views in Fig. 12. The lower U-arms, illustrated by the U-arm 3ᵇ, is provided with a notch on its side surface in which the right angle wing of the U-shaped clip 23ᵈ lies. This is apparent from Fig. 1.

Riveted through the lower arm of the U-shaped clip 3ᵈ, as will appear from Fig. 12, is a rivet which is provided with a knurled or roughened upper surface. Lying between this roughened upper surface and the lower face of the upper arm of the U-clip 22ᵈ is a lever 24ᵈ provided with a longitudinal slot 24'. Extending through these parts, as is clear from Fig. 12, is a nut or screw 45 by means of which arm 24ᵈ may be locked in any position. One end of the arm 24ᵈ is offset, as indicated at 24² and provided with a small hole by means of which the actuating mechanism is connected to the structure of this invention. The purpose of this construction will be described in detail later.

In this connection it may be pointed out that the structure of this invention is adapted for use in recording instruments which are actuated by means of temperature, pressure, electrical and other devices for recording or indicating the desired data, as is well known in this art.

Figure 13:
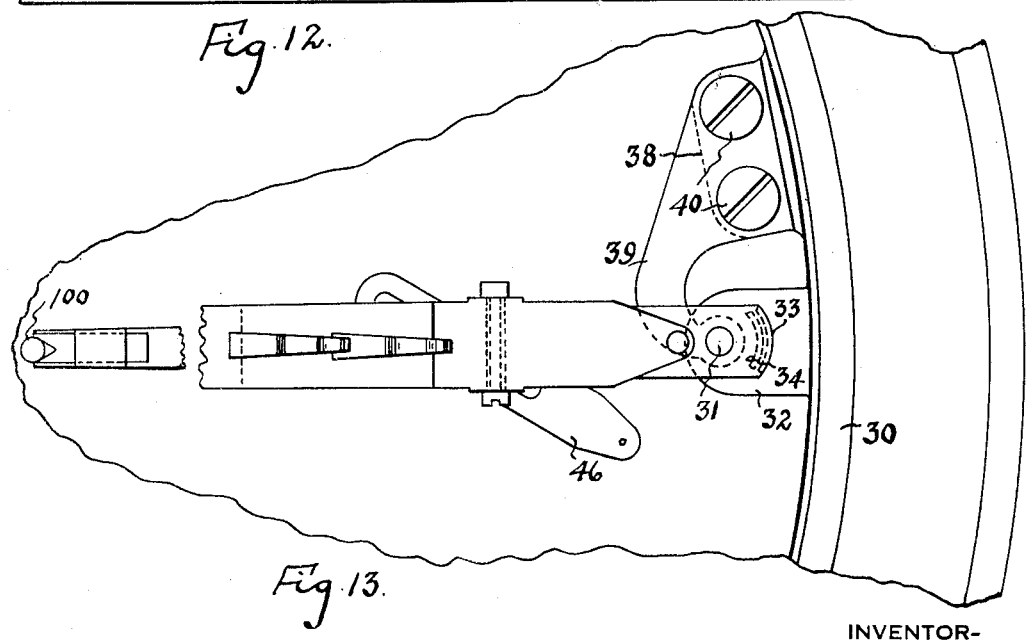
Fig. 13 is a top plan view of this form.

A modified form of construction is shown in Figs. 12 and 13 which, in this case, has only two pen arms. The instrument casing is shown at 30 provided with an integral boss 32 in which is mounted the arbor 31. Pivotally mounted on this arbor are the U-shaped supporting mechanisms 33 and 34 provided with the upper U-arms 33ª and 34ª and the lower U-arms 33ᵇ and 34ᵇ, respectively. At 35 and 37 are spacers or sleeves for holding the parts in the proper relative position with sleeve 35 pinned to the arbor by means of the pin 36. As before, an integral boss 38 is formed on the casing, to the upper end of which is secured a bracket 39 by means of screws 40. The arbor passes through bracket 39 which is supported thereby. Also as before, arbor 31 only slidably fits into the hole in boss 32 so that it may have a limited longitudinal movement and is free to rotate, giving a structure of minimum resistance to the movement of the U members.

In the particular construction shown a small sleeve 50 lies between the arm 39 and the U member 34. The dial of the instrument is illustrated diagrammatically at 41. The details of the pen arms and the pen arm adjusting mechanism will not be described in detail since it is the same as that already described. The pens are illustrated diagrammatically at 100.

Fig. 12 shows in cross-section the adjusting mechanism by means of which the operating devices are attached to the U members and shows them in cross-section, further illustrating the structure described in connection with Fig. 11. In this case the U-shaped clips secured to the lower U-arms are shown at 43, through the lower arms of which pass the members 42 which are riveted in place. The upper surfaces of these members are knurled or roughened and the arms 46 lie between this roughened surface and the lower surface of the upper arms of the U-clips. The screws or bolts 45 serve to lock the arms 46 in any desired radial and circumferential position. The advantage of this construction is that when the arms 46 are adjusted to the desired position and the screws 45 tightened the arms do not tend to move out of their adjusted position as the screws are tightened.

It will be noted that the main distinction between the construction of Figs. 12 and 13 and that of Fig. 1 is that the vertical or central portions of the U members, instead of oscillating about their supporting arbor on the same radius, oscillate on different radii so that they are concentric and move one within the other. With this construction pen arms may be given a greater angular movement than in the case of the construction of Fig. 1. In other words, the pen arms including the central portions of the U members, in the construction of Fig. 12, may all move within the same angular space.

An important feature of both constructions illustrated in this case lies in the fact that the U members are pivotally supported on the arbors as axes of rotation very close to the vertical or central portion of the U members. This provides a structure requiring a minimum amount of space and insuring at the same time a simple as well as a rugged structure. The U-shaped members have the integral upper and lower U-arms extending relatively a considerable distance from the arbors upon which the pen arms and their adjusting mechanism are mounted.

From the above detailed description it will be apparent that my invention involves certain principles of construction and assembly which may be embodied by those skilled in the art in other physical forms and I do not, therefore, desire to be strictly limited to the disclosure as given for purposes of illustration but rather to the scope of the appended claims.

What I seek to secure by United States Letters Patent is:

1. In a construction of the type described, the combination comprising an instrument casing, an arbor rod supported in said casing, a U-shaped member pivotally supported on the arbor near the base of the U-arms, a detachable pen arm connected to one U-arm, and a radially and circumferentially adjustable securing means attached to the other U-leg for connecting the device to an operating mechanism.

2. In a construction of the type described, the combination comprising a support, an arbor mounted at one end on the support so as to be freely rotatable and longitudinally movable, a bracket attached to the support through which the arbor loosely passes, a U-shaped member pivotally supported on the arbor, and means for limiting the longitudinal movement of the U-shaped member on the arbor.

3. A construction of the type described comprising a support, an arbor freely mounted at one end on the support, means encircling the arbor for freely supporting it at the other end, a plurality of U-shaped members pivotally mounted on the arbor, a plurality of sleeves interposed between the U-shaped members, and a pin extending through one of the sleeves and the arbor to permit rotational movement of the arbor and limited longitudinal movement thereof.

4. In a construction of the type described, the combination comprising a support, an arbor loosely mounted on the support at one end, a bracket encircling the arbor adjacent its other end and secured to the support, a plurality of U-shaped members pivotally supported on the arbor which passes through each at two points, a plurality of sleeves mounted on the arbor, and means for securing one of the sleeves to the arbor to permit rotational movement of the arbor and limited longitudinal movement so that the U-shaped members will be rotatable on the arbor with a minimum of frictional resistance.

5. A construction of the type described having a support, an arbor mounted on the support, and a plurality of U-shaped members pivotally mounted on the arbor, the central portion of each U-shaped member being offset from the longitudinal axis of the U-arms and having the same radial extent.

6. A construction of the type described comprising an instrument base, an arbor mounted on the base, a plurality of U-shaped members pivotally mounted on the arbor, the central portion of each U-shaped member lying at an angle with its corresponding U-arms and all lying in the same path of circular movement, and means for spacing the U members from each other on the arbor.

7. In a construction of the type described, the combination comprising an instrument casing, an arbor freely mounted on the casing in spaced supports, a plurality of U members pivotally mounted on the arbor, a plurality of spacing sleeves mounted on the arbor between the instrument casing and the U members, and means for securing one of the spacer sleeves to the arbor to permit of freedom of movement of the U members on the arbor and the arbor on its supports.

8. In a construction of the type described, the combination comprising an instrument casing, an arbor freely mounted on the casing in spaced supports, a plurality of U members pivotally mounted on the arbor, a plurality of spacing sleeves mounted on the arbor between the instrument casing and the U members, and means for securing one of the spacer sleeves to the arbor to permit of freedom of movement of the U members on the arbor and the arbor on its supports, the central portions of each U member lying in a plane at an angle to the respective U-arms thereof.

9. In a construction of the type described, the combination comprising an instrument casing, an arbor freely mounted on the casing in spaced supports, a plurality of U members pivotally mounted on the arbor, a plurality of spacing sleeves mounted on the arbor between the instrument casing and the U members, and means for securing one of the spacer sleeves to the arbor to permit of freedom of movement of the arbor, the central portions of each U member lying in a plane at an angle to the respective U-arms thereof and said central portions all lying at the same radial distance from the arbor.

10. In a construction of the type described, the combination comprising a U-shaped member, an angularly adjustable pen arm secured to one of the U-legs of said member, and a radially circumferentially adjustable connecting means secured to the other U-leg of said member.

11. In a construction of the type described, the combination comprising a pen arm support, a U-shaped clip, means passing through one leg of the U-shaped clip for attaching it to the pen arm support, a lever lying between said means and the other arms of the clip, and means passing through said other arm, the lever and said means for securing said lever in any one of a number of angular and longitudinal positions.

12. A construction of the type described comprising a support, an arbor freely mounted at one end of the support, means encircling the arbor for loosely supporting it at the other end, a plurality of U-shaped members pivotally mounted on the arbor, a plurality of loose sleeves interposed between the U-shaped members, and means for securing one of the sleeves to the arbor whereby the U-shaped members are free for rotational and longitudinal movement.

RUDOLF BECK.